United States Patent
Zhou et al.

(10) Patent No.: US 10,264,036 B1
(45) Date of Patent: Apr. 16, 2019

(54) COMMUNICATION-BASED DIGITAL ALLIANCE MANAGEMENT

(71) Applicant: Project Affinity, Inc., San Francisco, CA (US)

(72) Inventors: Ray Zhou, San Francisco, CA (US); Shubham Goel, San Francisco, CA (US); Hansen Qian, San Francisco, CA (US); Bobby Zhang, San Francisco, CA (US); Craig Dabney, San Francisco, CA (US)

(73) Assignee: Project Affinity, Inc., San Francisco, CA (US)

(*) Notice: Subject to any disclaimer, the term of this patent is extended or adjusted under 35 U.S.C. 154(b) by 0 days.

(21) Appl. No.: 15/959,145

(22) Filed: Apr. 20, 2018

(51) Int. Cl.
- H04L 29/06 (2006.01)
- G06F 17/30 (2006.01)
- H04L 29/08 (2006.01)

(52) U.S. Cl.
CPC ...... H04L 65/403 (2013.01); G06F 17/30106 (2013.01); G06F 17/30112 (2013.01); H04L 67/22 (2013.01); H04L 67/06 (2013.01)

(58) Field of Classification Search
CPC ....... H04L 65/403; H04L 67/06; H04L 67/22; G06F 17/30106; G06F 17/30112
See application file for complete search history.

(56) References Cited

U.S. PATENT DOCUMENTS

| | | | |
|---|---|---|---|
| 8,386,619 B2* | 2/2013 | Mallet | G06Q 50/01 709/227 |
| 8,392,526 B2* | 3/2013 | Mallet | G06Q 50/01 709/217 |
| 8,539,086 B2* | 9/2013 | Mallet | G06Q 50/01 709/227 |
| 8,880,600 B2* | 11/2014 | Lento | G06Q 10/10 709/204 |
| 8,930,459 B2* | 1/2015 | Mallet | G06Q 50/01 709/204 |
| 8,935,332 B2* | 1/2015 | Mallet | G06Q 50/01 709/204 |
| 8,954,506 B2* | 2/2015 | Mallet | G06Q 50/01 709/204 |
| 8,959,153 B2* | 2/2015 | Mallet | G06Q 50/01 709/204 |
| 8,972,501 B2* | 3/2015 | Mallet | G06Q 50/01 709/204 |
| 9,665,584 B2* | 5/2017 | Jayaram | G06F 17/30106 |
| 9,858,348 B1* | 1/2018 | Higgins | H04W 4/02 |
| 2008/0070593 A1* | 3/2008 | Altman | H04W 4/029 455/457 |

(Continued)

Primary Examiner — Michael C Lai
(74) Attorney, Agent, or Firm — Hickman Palermo Becker Bingham LLP

(57) ABSTRACT

A communication management server computer ("server") and related methods are disclosed to create and store digital records representing alliances between user accounts and to use the alliance records in filtering messages or other content and/or determining attributes of messages or content for display. The server allows two electronic devices associated with two user accounts to establish an alliance, where each of the two user accounts offers a set of digital communications for exploration of relationships and agrees to share certain types of information regarding the relationships with the other user account.

20 Claims, 9 Drawing Sheets

(56) References Cited

U.S. PATENT DOCUMENTS

2013/0297652 A1* 11/2013 Higgins .................. H04W 4/02
    707/770
2014/0297631 A1* 10/2014 Jayaram ............ G06F 17/30106
    707/728
2014/0297748 A1* 10/2014 Mauney ............ G06F 17/30106
    709/204
2014/0297749 A1* 10/2014 Jayaram ............ G06F 17/30106
    709/204
2014/0298204 A1* 10/2014 Jayaram ............ G06F 17/30106
    715/753

* cited by examiner

COMMUNICATION-BASED DIGITAL ALLIANCE MANAGEMENT

FIELD OF THE DISCLOSURE

One technical field of the present disclosure is digital communication processing. Another technical field is computer-implemented analysis of digital communications including automatic filtering of messages and electronic documents.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The Internet has made it easy to connect with others electronically but also challenging to manage such connections. Existing social network systems and professional network systems typically create and store digital records of friends or connections based upon a binary sense of linkage: a first user account is either a friend or connection of a second user account, or not. There are limited ways to account for the type of relationship and limited ways to filter the display of messages, electronic documents or other content based upon the type or strength of relationship. Furthermore, computer-implemented tools for supporting decisions based on type or strength of relationship are either too complex, being directed to intelligence analysis and the like, or inappropriate for business communication management. It would be helpful to have computer support to identify whom to contact for specific purposes and how to establish such a contact more efficiently and effectively.

DETAILED DESCRIPTION

Figure 1:
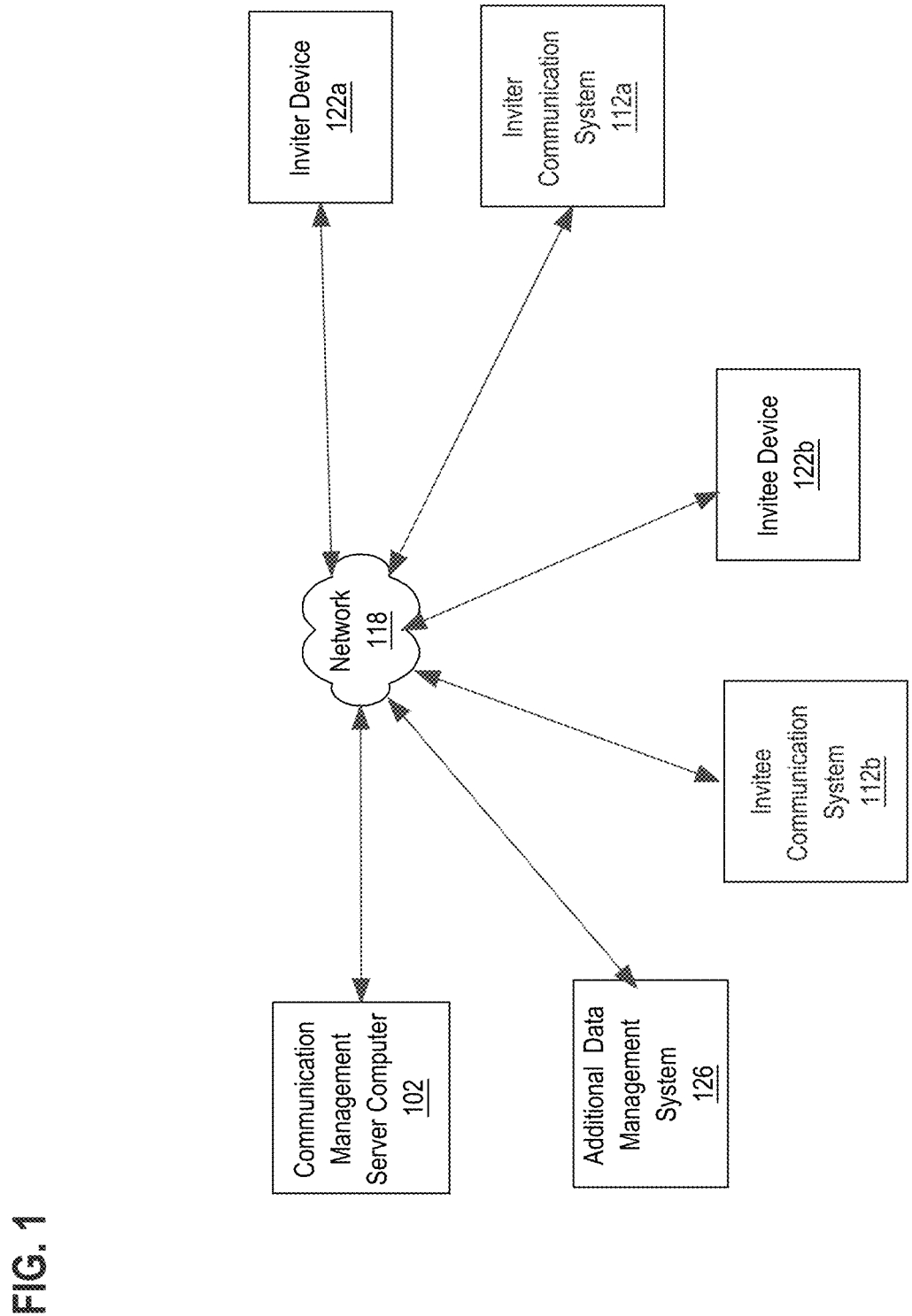
FIG. 1 illustrates an example networked computer system in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:
1. GENERAL OVERVIEW
2. EXAMPLE COMPUTING ENVIRONMENT
3. EXAMPLE COMPUTER COMPONENTS
4. FUNCTIONAL DESCRIPTION
    4.1. DEVELOPING ALLIANCES
    4.2. UTILIZING ALLIANCES
5. EXAMPLE PROCESSES
6. HARDWARE IMPLEMENTATION
\*\*

1. General Overview

A communication management server computer ("server") and related methods are disclosed to create and store digital records representing alliances between user accounts and to use the alliance records in filtering messages or other content and/or determining attributes of messages or content for display. The server allows two electronic devices associated with two user accounts to establish an alliance, where each of the two user accounts offers a set of digital communications for exploration of relationships and agrees to share certain types of information regarding the relationships with the other user account. Each user account can be associated with one or more electronic devices. The user account and each associated electronic device may be referenced interchangeably hereinafter. Two user accounts in an alliance are allies of each other.

For example, user accounts associated with individuals A and B are established in digital records in the system; A works for a marketing company and B works for a customer services company. A knows B and communicates with B through email. Now A hopes to expand A's network via B's connections. A is represented by A's electronic device or user account, and B is represented by B's electronic device or user account. In some embodiments, A's electronic device can be programmed to transmit a request to the server to invite B's electronic device to form an alliance. The request indicates what A offers in forming the alliance, specifically a set of digital communications between A and other individuals. For example, A might offer the messages within the email account A uses to communicate with B, where the parties ("contacts") involved in those messages include C and D. The request can also indicate what A is willing to share with B. For example, A might decide to share with B only the name, an email address, and a relationship strength associated with each of A's contacts revealed by A's email messages. In addition, the request can indicate what A requests B to offer in forming the alliance, such as the messages within the email account B uses to communicate with A. The request can also indicate what A would like B to share with A, such as the name, an email address, and a relationship strength that is associated with each of B's contacts revealed by B's email messages. The server is programmed or configured to transmit, in response, an invitation based on the request to form an alliance to B's electronic device. B can accept or reject the invitation. To accept the invitation, B's electronic device can be programmed to transmit a response to the server. The server is programmed to create and store digital records representing an alliance between A's device and B's device and by association between A and B, who become allies of each other. Allies can be in symmetric positions exploring each other's relationships in similar manners regardless which ally was the inviter or which ally was the invitee. Thus, at least after an alliance is formed, any operation performed by an inviter device can be performed by an invitee device, and vice versa.

In other embodiments, A's request may not indicate what A expects from B, and B's response can indicate what B would offer or be willing to share with A upon forming an alliance. A's electronic device and B's electronic device can continue to negotiate through the server until an agreement is made.

In some embodiments, upon forming an alliance, the server is programmed or configured to determine A's relationships with A's contacts from the set of digital communications offered by A and determine B's relationships with B's contacts from the set of digital communications offered by B. The determination may be based upon metadata representing past computer-based interactions or digital communications between the user accounts. For example, the analysis of B's email messages might reveal E to be one of B's main contacts. The server can be programmed to further determine, based on B's email messages or external data sources, that E works as a manager for a technology company. Subsequently, A might need to find prospects who are managers at technology companies. A's electronic device can submit a query for information regarding such prospects to the server. According to the alliance, the server is then programmed to return the types of information regarding E that is sharable with A, such as the name, an email address, and a relationship strength associated with E, in response to the query. In addition, the server can be configured to facilitate an introduction of A by B to E, thereby expanding A's network via B's connections.

The communication management server computer offers many technical benefits. By using alliance data records as a basis of filtering messages that are transmitted between user accounts, for example, the server reduces the number of digital transmissions among electronic devices and thus reduces network traffic at multiple levels. Initially, fewer alliances are formed than simple links or connections as formation of an alliance requires offering certain digital communications for relationship exploration, discovery, and development, when those digital messages are otherwise maintained in private communication accounts. Therefore, the volume of invitations and responses associated with alliances is smaller than those associated with simple links or connections. Furthermore, fewer substantive communications are made to reach the contacts of allies because the digital communications offered by the allies enable careful evaluation of relationship strengths and direction of communication efforts to relatively strong relationships. The server's ability to focus on relatively strong relationships also increases the quality of digital communications and saves users' time. By tapping into available resources, namely automatically analyzing user's past digital communications, the server allows a user to quickly expand the user's network and accomplish project goals while bolstering existing relationships without much extra work.

2. Example Computing Environment

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, the networked computer system comprises a communication management server computer 102 ("server"), one or more inviter devices 122a, one or more inviter communication systems 112a, one or more invitee devices 122b, one or more invitee communication systems 112b, and one or more additional data management systems 126, which are communicatively coupled directly or indirectly via one or more networks 118.

In some embodiments, the server 102 broadly represents one or more computers, virtual computing instances, and/or instances of a server-based application that is programmed or configured with data structures and/or database records that are arranged to host or execute functions including but not limited to managing alliances each formed by two electronic devices respectively associated with two user accounts and digital communications of the two user accounts associated with the alliance. "Alliance," in this context, refers to digital data stored in records in a database or other data repository that indicate or represent a relationship between a first user account and a second user account, where the existence of a relationship drives execution of data filtering and transmission operations according to constraints, as further described herein. The server 102 can comprise a server farm, a cloud computing platform, a parallel computer, or any other computing facility with sufficient computing power in data processing, data storage, and network communication for the above-described functions.

In some embodiments, an inviter device 122a associated with an inviter is programmed to extend an invitation to an invitee device 122b associated with an invitee to form an alliance and, after an alliance is formed, explore relationships of the invitee based on certain digital communications of the invitee originally managed by the invitee communication system 112b. The inviter device 122a may comprise a desktop computer, laptop computer, tablet computer, smartphone, wearable device, or any other type of computing device with sufficient computing power in data processing, data storage, and network communication.

In some embodiments, the inviter communication system 112a is programmed to manage one or more communication accounts of the inviter holding digital communications of the inviter, such as email messages, calendar entries, phone call histories, or chat messages. Typically, such a communication account is associated with certain credentials that are required for access to the communication account and the digital communications therein. In certain embodiments, the inviter communication system 112a may be integrated with the inviter device 122a.

In some embodiments, an invitee device 122b is programmed to receive the invitation from the inviter device 112a, accept or reject the invitation, and, after the alliance is formed, explore relationships of the inviter based on certain digital communications of the inviter originally managed by the inviter communication system 112a. The invitee device 122b is otherwise similar to the inviter device 122a.

In some embodiments, the invitee communication system 112b is programmed to manage one or more communication accounts of the invitee holding digital communications of the invitee, such as email messages, calendar entries, phone call histories, or chat messages. Typically, such a communication account is associated with certain credentials that are required for access of the account and the digital communications therein. In certain embodiments, the invitee communication system 112b may be integrated with the invitee device 122b.

In some embodiments, the data management system 126 is programmed to manage one or more data sources, such as data regarding people, corporations, or other types of entities.

The networks 118 may be implemented by any medium or mechanism that provides for the exchange of data between the various elements of FIG. 1. Examples of network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the inviter device 122a is configured to send a request to the server 102 for inviting the invitee device 122b to form an alliance. The request contains information necessary to access a communication account of the inviter managed by the inviter communication system 112a, the portion of the digital communications from which relationships of the inviter can be identified for the invitee, and the types of information regarding these relationships that can be shared with the invitee. The server 102 is programmed to send an invitation based on the request to the invitee device 122b. The invitee device 122b is configured to reject or accept the invitation. To accept the invitation, the invitee device 122b is configured to send a response to the server 102. The response similarly contains information necessary to access a communication account of the invitee managed by the invitee communication system 112b, the portion of the digital communications from which relationships of the invitee can be identified for the inviter, and the types of information regarding these relationships that can be shared with the inviter.

In some embodiments, the server 102 is programmed to establish an alliance between the inviter device 122a and the invitee device 122b based on the request from the inviter device 122a and the response from the invitee device 122b. The server 102 is programmed to further access the communication accounts of the inviter and the invitee to retrieve digital communications of the inviter and invitee and identify relationships from the portions of the digital communications of the inviter and the invitee according to the alliance. In addition, the server 102 is programmed to access the data sources managed by the data management system 126 to retrieve data regarding different types of entities that may be involved in the relationships.

In some embodiments, the inviter device 122a (or the invitee device 122b) is configured to send a query for information related to certain prospects. The server 102 is programmed to respond to the query by searching the data regarding the relationships identified from the portion of the communications of the invitee (or the inviter) according to the alliance and additional data regarding the entities involved in the relationships and return the search result to the inviter device 122a (or the invitee device 122b).

3. Example Computer Components

Figure 2:
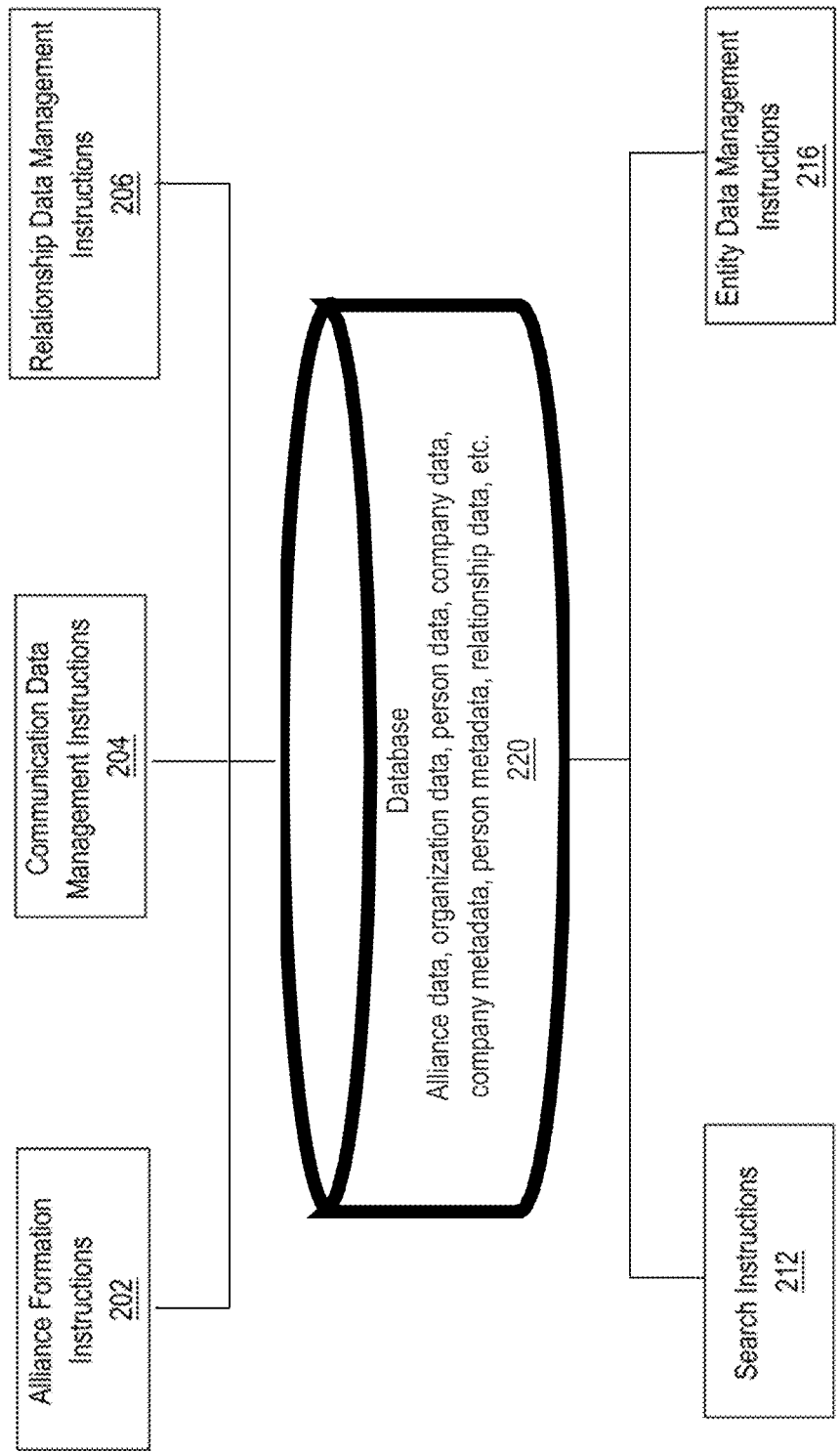
FIG. 2 illustrates example components of a communication management server computer in accordance with the disclosed embodiments.

FIG. 2 illustrates example components of the communication management server computer in accordance with the disclosed embodiments. This figure is for illustration purposes only and the server 102 can comprise fewer or more functional or storage components. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the server 102 can comprise an alliance formation component 202, a communication data management component 204, a relationship data management component 206, a search component 212, and an entity data management component 216. In addition, the server 102 can comprise a database module 220.

In some embodiments, the alliance formation component 202 is programmed or configured to manage the formation of an alliance between an inviter device 122a and an invitee device 122b, such as communicating with such devices in forming the alliance.

In some embodiments, the communication data management component 204 is programmed or configured to manage digital communications of the inviter and the invitee. Such management may include communicating with the inviter communication system 112a and the invitee communication system 112b to retrieve digital communications of the inviter and the invitee and managing copies or views of these digital communications in local databases.

In some embodiments, the relationship data management component 206 is programmed or configured to manage relationship data derived from the digital communications of the inviter and invitee. Such management may include identifying relationships from the digital communications and controlling which types of information regarding the relationships are made accessible to a specific user device.

In some embodiments, the search component 212 is programmed or configured to manage the search process in response to a query from a user device. Such management may include communicating with the user device and searching the relationship data in local databases for matches to the query.

In some embodiments, the entity data management 216 is programmed or configured to manage data regarding different types of entities, such as a person or an individual, a company or a corporate entity, or an organization of any purpose, or other data relevant for relationship exploration and formation. Such management may include communicating with the data management system 126 and supplementing the relationship data with entity data or other data retrieved from external data sources.

In some embodiments, the database 220 is programmed or configured to manage relevant data structures and store relevant data for functions performed by the server 102. The data may correspond to alliances, organizations, persons or individuals, companies or other corporate entities, and relationships. As further discussed below, the server 102 can be programmed to assign each user to an organization and automatically form alliances between every pair of user accounts who belong to the same organization. For example, an organization can correspond to a corporate entity, a department within a corporate entity, a high school class, a choir, or a wine club. For further example, for an individual, values of various attributes may be stored, such as name, communication mechanisms, credentials for communication accounts, names of organizations to which the individual belongs, or names of employers. For a corporate entity, values of various attributes may also be stored, such as name, location, size, or industry.

4. Functional Description

4.1 Developing Alliances

In some embodiments, the server 102 is programmed or configured with data structures and/or database records that are arranged to receive a request for forming an alliance from an inviter device 122*a* associated with an inviter. The inviter could be an administrator of the server 102 or a regular user. The request identifies the inviter or the inviter device. The request also identifies an invitee, which can include a name or the ID of a communication account, such as an email address, a phone number, or a chat program user ID.

In some embodiments, the request can include information regarding access to one or more of the inviter's communication accounts, such as an account for email, event scheduling, or chat. The request can indicate a selection criterion to be applied to the digital communications in the one or more communication accounts, indicating a set of the inviter's digital communications to be associated with the alliance. The selection criterion can refer to any field of a digital communication. For example, the selection criterion can be all the email messages in the folder named "Construction Project", all the email messages of which a specific user did not receive a copy, or all the calendar entries for events that took place during March. The request can also provide a specification of the types of information regarding relationships identified from the set of the inviter's digital communications that are to be shared with the invitee device 122*b*. Default types of information can include names of individuals or contacts in the relationships and the corresponding relationship strengths. Additional types of information can include, for each of those contacts, a summary of digital communications with the contact in terms of communication mechanism, frequency, nature, etc. The credentials for the one or more communication accounts, the selection criterion, or the specification of the types of information regarding the relationships to be shared can also be transmitted to the server 102 after a response is received from the invitee device 122*b*.

Moreover, the request can provide information regarding expanding the alliance. For example, default relationship sharing can be that only two parties that form an alliance can explore the other's relationships based on the digital communications offered by the other for relationship exploration and discovery. The default can then be expanded via a transitive relationship. For further example, A and B forms an alliance, so that information regarding A's relationships based on A's email is shared with B and information regarding B's relationships based on B's calendar entries is shared with A. Subsequently, A and C forms a separate alliance, where information regarding A's relationships based on A's chats is shared with C and information regarding C's relationships based on C's email is shared with A. The default can be that nothing is shared between B and C before they form their own alliance. The default can then be expanded by one degree of alliance, so that through A, information regarding B's relationships based on B's calendar entries is shared with C and information regarding C's relationships based on C's email is shared with B. B or A can also specify that while information regarding B's relationships based on all of B's calendar entries is shared with A, only information regarding B's relationships based on some of B's calendar entries is shared with an individual who is not B's ally. The individuals that share relationship information through one or more alliances are then in an "alliance network". In the example above, B could be the inviter, and A could be the invitee. When a maximum degree for B's alliance network is two (one or more than default), C is allowed to share B's relationship information through A. Thus, request from the inviter device 122*a* can also indicate a maximum degree (with one being the default) for the inviter's alliance network or a selection criterion for each additional degree. This request can also be transmitted to the invitee device 122*b* after a response is received from the invitee device 122*b*.

Furthermore, the request can include additional privacy settings or constraints applicable to the alliance to be formed. Similar privacy settings or constraints can also be specified at the user account level applicable to all alliances formed by the inviter or associated user account. Such privacy constraints can limit the use of the alliance to be formed to varying degrees. For example, a privacy constraint can allow exploration of relationships within the inviter's communication accounts associated with this alliance only by the invitee account and other individuals who work in specific industries or in certain business positions. For further example, another privacy constraint can hide the identity of the inviter when one of the relationships that can be derived from the inviter's communication accounts is included in a search result for a search query made by a user account other than the invitee account.

In some embodiments, upon receiving the request, the server 102 is programmed to look up the inviter in the database 220, including identifying an organization to which the inviter belongs. The server 102 can be programmed to also look up the invitee in the database 220 and if data regarding the invitee is found identify an organization to which the invitee belongs. Then, the server 102 is programmed to prepare an invitation based on the request and have the invitation transmitted to an invitee device 122*b*. The invitation includes information regarding the inviter, such as the name, the organization identified for the inviter, or an email address. The invitation also indicates an intention to form an alliance with the invitee by offering each other's digital communications for relationship exploration and discovery. In addition, the invitation can include a summary of the digital communications offered by the inviter for relationships exploration and discovery. For example, the summary can be a description of the selection criterion provided by the inviter device 122*a*. The invitation can also include one or more other types of information included in the request.

Furthermore, the invitation includes a request to provide access to one or more of the invitee's communication accounts. The invitation can further include a request to provide a selection criterion to be applied to the digital communications in the one or more communication accounts, indicating the set of the invitee's digital communications to be associated with the alliance. In addition, the invitation can include a request to provide a specification of the types of information regarding relationships identified from the set of the invitee's digital communications that are to be shared with the inviter device 122*a*. The invitation can also include a request for the invitee to join the organization identified for the inviter. Furthermore, the invitation can include a request to indicate a maximum degree for the invitee's alliance network or a selection criterion for each additional degree. One or more of the requests discussed in this paragraph can also be transmitted to the invitee device 122b after a response is received from the invitee device 122b.

In some embodiments, the server 102 is programmed to receive a response to the invitation from the invitee device 122b. The response can include a rejection of the invitation, in which case the server 102 is configured to send a notification of the rejection to the inviter device 122a. Alternatively, the response can include an acceptance of the invitation. In that case, the server 102 is configured to send a notification of the acceptance to the inviter device 122a. The response can also include information that allows the server 102 to access one or more of the invitee's communication accounts. The response can also include a selection criterion to be applied to the digital communications in the one or more communication accounts. In addition, the response can include a specification of types of information regarding relationships identified from the set of the invitee's digital communications that are to be shared with the inviter device 122a. In addition, the response can include an indication of whether to join the organization identified for the inviter, to remain in the organization identified for the invitee, or to form a new organization corresponding to the alliance. Moreover, the response can include a maximum degree for the invitee's alliance network or a selection criterion for each addition degree. Similar to a request, the response can include other types of information, such as privacy settings or constraints specific to the alliance being formed. It is to be understood that the formation of an alliance can be an iterative process, with parts of the requests or response provided to the server 102 in an incremental manner in a negotiation between the inviter device 122a and the invitee device 122b until an agreement is reached. In addition, default values can be used so that not all parts of the request and response discussed above need to be communicated to the server 102.

In some embodiments, upon receiving the response, when the invitee is a new user, the server 102 is programmed to request additional information regarding the invitee and the invitee device 122b, such as a business entity the invitee works for, different contact mechanisms to reach the invitee, and so on. Overall, the server 102 is configured to store all the data received from the inviter device 122a and the invitee device 122b to the database 220, which constitute at least part of digital alliance data representing the alliance between the inviter and the invitee. The server 102 can also be programmed to transmit certain data in the response that did not correspond to any part of the request to the inviter device 122a.

In some embodiments, the server 102 is programmed to receive a request for forming an alliance from an inviter device 122a or any other user device that does not identify an invitee. The server 102 can be programmed to post an invitation corresponding to the request at an address accessible to one or more user devices, such that a selection of the address or a view of the posting by an invitee device 122b or any other user device generates an acceptance of the invitation or at least triggers a process to respond to the invitation, as described above. The server 102 can be programed to also broadcast the address to select user devices, or without any posting, directly broadcast the invitation to select user devices. Alternatively, the server 102 can be configured to rely on the sender of the request to communicate the address to other user devices. For example, the address can be in the form of a URL, and the address can be announced by the inviter device 122a to every email address in an address book associated with the inviter device 122a.

In some embodiments, the server 102 is programmed to receive a request to become a user from a user device, which is then able to extend invites to another user device to form an alliance. The request can also be submitted on behalf of another user device associated with another user. For example, a request can be to sign up all the user devices associated with all the employees of an employer, offering all the employees' email accounts for forming alliances. In response, the server 102 can be configured to assign all those user devices and the associated user accounts to the same organization, which may correspond to the employer's corporate entity. The server 102 can be programmed to further form an alliance between every pair of those user devices, so that each employee has access to the relationships revealed by every other employee's email.

In some embodiments, the server 102 is programmed to access the one or more of the inviter's communication accounts and download the communications into the database 220 as soon as the credentials for the one or more communication accounts are received, according a specific schedule, or in response to a relevant search, such as a search by the invitee. The download can be incremental to a previous download. The server 102 is further programmed to apply each selection criterion provided by the invitee for the alliance to the digital communications in the one or more communication accounts to obtain a set of the inviter's digital communications specific to the inviter or another individual in the invitee's alliance network according to a specific schedule or in response to a relevant search.

In some embodiments, the server 102 is configured to further identify a list of contacts from the set of the inviter's digital communications and corresponding relationship strengths. For example, when the set of the inviter's digital communications is a number of email messages, the senders or recipients of each email message other than the inviter can be identified, and the number of times each of these individuals is a sender or a receiver can be used to compute the corresponding relationship strength. The inviter's digital communications can be augmented with additional data from external data sources in determining the relationship strengths. Examples of the additional data include communication information related to public conferences, events, or social networks. The server 102 is programmed to establish person data for each of the contacts based on the set of digital communications or external data sources. For example, the employer of a contact may be derived from the email address of the contact or specific remarks of the contact in the set of digital communications. Such employment information can also be retrieved from the employer's website or other public data sources. The contact can also be assigned to one of the organizations in a similar manner. Depending on the types of information regarding relationships identified from the set of the inviter's digital communications that are to be shared with the invitee or another individual in the inviter's alliance network, the server 102 can be configured to determine additional types of information concerning the relationships. For example, for each identified contact, the server 102 can be configured to compute the number of digital communications via a specific communication mechanism or within a specific period of time; the server 102 can also be configured to compile a list of headers of these digital communications or a summary of all these digital communications. The server 102 is programmed to further repeat this process with the invitee's digital communications based on the invitee's acceptance.

4.2 Utilizing Alliances

In some embodiments, the server 102 is programmed to receive a query from a first user device associated with the first user for relationship information associated with a second user who is an ally of the first user. In response, the server 102 is programmed to determine the list of relationships of the second user and specific types of information regarding those relationships according to the alliance with between the first user and the second user. The identification can be performed by real-time computation or based on data already stored in the database 220. For example, when the second user has agreed to share with the first user email and relationship strength information regarding his relationships based on a selection of his calendar entries, the server 102 can be configured to access the second user's calendar entries, obtain the selection of calendar entries, identify the list of contacts from the selection, and retrieve or compute the corresponding list of relationship strengths for those contacts. Alternatively, the selection of calendar entries, the list of contacts, or the list of relationship strengths may already be in the database 220 and simply need to be retrieved. Similarly, the query may be for relationship information associated with a third user who is in the first user's alliance network. The server 102 is programmed to further return the specific types of information regarding a list of relationships of the third user visible to the first user to the first user device.

Figure 3:
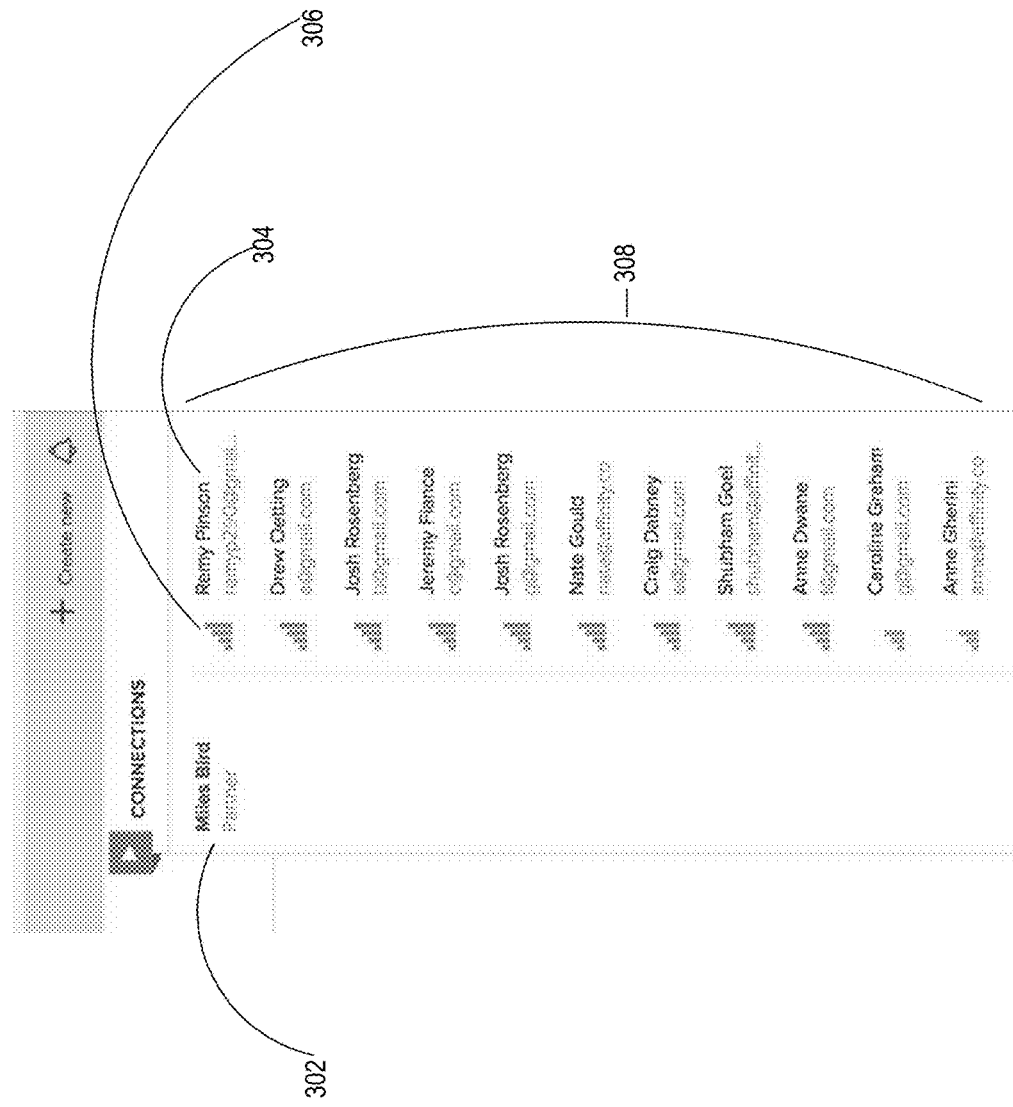
FIG. 3 illustrates an example screen of a graphical user interface that shows information regarding a list of relationships of a second user visible to a first user and the corresponding relationship strengths according to an alliance between the first user and the second user.

FIG. 3 illustrates an example screen of a graphical user interface that shows information regarding a list of relationships of a second user visible to a first user and the corresponding relationship strengths according to an alliance between the first user and the second user. In this example, identifying information 302 regarding the second user is displayed. A list of entries 308 corresponding to the list of relationships each including identifying information regarding a contact of the second user and the corresponding relationship strength is also displayed. Specifically, the first entry of the list includes the name and email address 304 of an individual and a relationship strength indicator 306 in the form of colored or shaded one through five bars, with more bars indicating a stronger relationship. The relationship strength indicator as shown here is for illustration only and it can have other shapes or forms. For example, it can use numerical values to indicate different relationship strengths. The screen can also be expanded to show the list of relationships of every employee within an organization and the corresponding list of entries similar to the list 308.

The query can be expanded to be for relationship information associated with a second user in the first user's alliance network. The screen can then include additional information for each of the list of determined relationships, such as the degree or the number of alliances required from the first user to reach an individual involved in the relationship. Each entry can also indicate information regarding the individuals forming these alliances. For example, when the second user and the third user are in an alliance and the third user is related to the fourth user for a certain relationship strength based on the email messages associated with an alliance between the third user and the second user, a degree of two, identifying information regarding the second user and the third user, and the certain relationship strength can be displayed.

Figure 4:
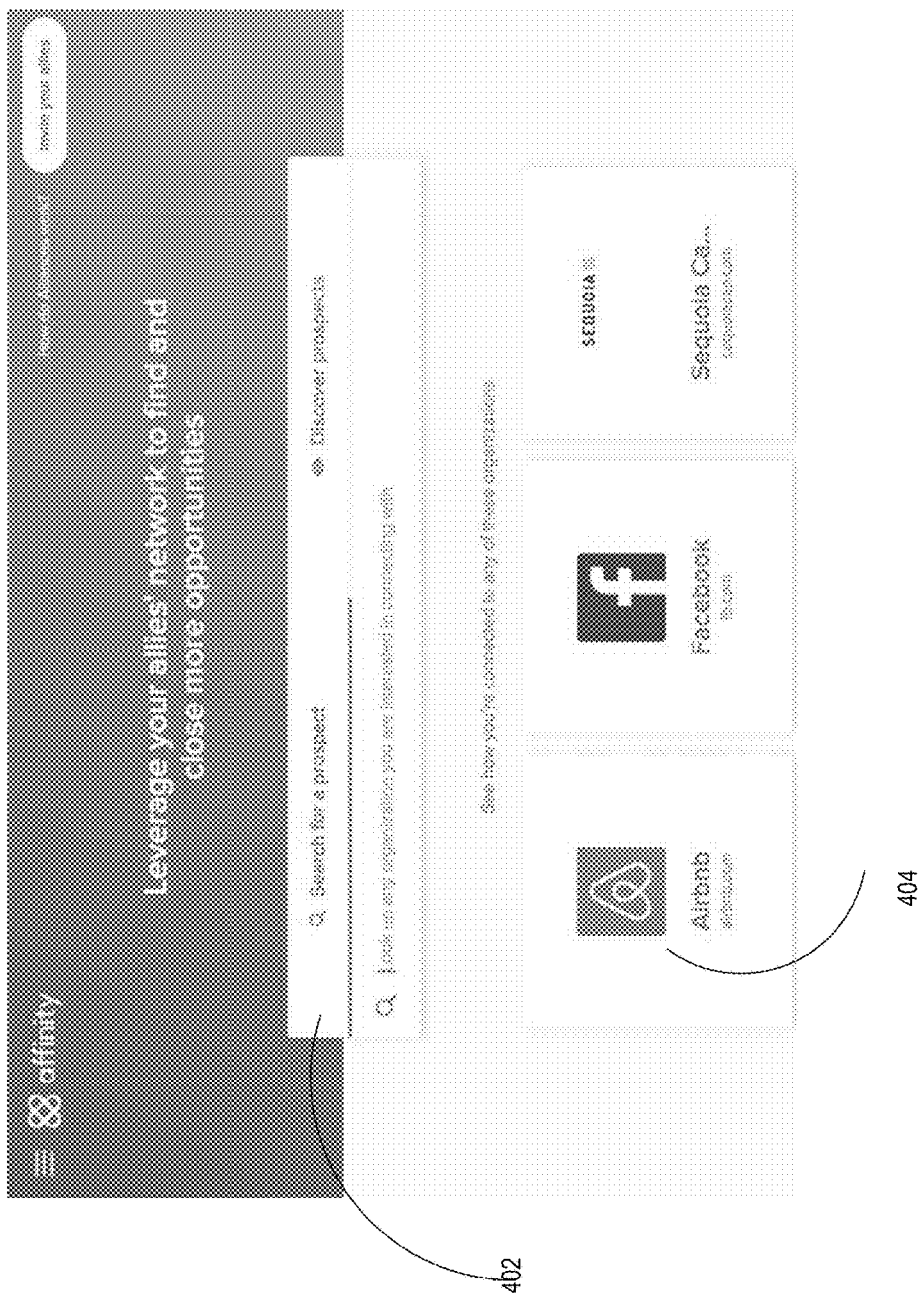
FIG. 4 illustrates an example screen that allows querying for information regarding relationships associated within an organization.

In some embodiments, the server 102 is programmed to receive a query for information regarding relationships within an organization from a first user device associated with a first user. FIG. 4 illustrates an example screen that allows querying for information regarding relationships within an organization. The screen includes a text field 402 for entering a text query, such as the name, address, or other identifying information or attributes of an organization. The screen also includes an icon 404 representing each of specific organizations, the selection of the icon leading to a query corresponding to the corresponding organization. These specific organization can be the most often searched by the first user device or by a specific group of user devices within a specific period of time. These specific organization can also be the most relevant to the first user device or the first user, such as prospective customers or employers for the first user.

In some embodiments, in response to the query, the server 102 is programmed to determine the queried organization. The text query provided by the first user device can be matched to organization data in the database 220 using a pattern matching technique known to someone skilled in the art based on specific rules. For example, an organization may have subsidiaries or subdomains. Such relations can be stored as part of the organization data or encoded in the organization matching rules. The server 102 is programmed to further identify a list of relationships involving individuals who are related to those user accounts who are in the first user's alliances (or alliance network) and who belong to the organization. Specifically, person data concerning those individuals can similarly be matched to organization data based on specific rules. For each of the list of relationships, the server 102 is programmed to also determine the types of information that are visible to the first user or first user device based on the alliance data, similar to the handling of the query for relationship information associated with a second user who is in an alliance with the first user discussed above. In addition, the server 102 is configured to perform some aggregation on the list of relationships. Such aggregation can include calculating a total number of relationships that correspond to the same individual in the queried organization, an average relationship strength over these relationships, or an aggregate of other types of data visible to the first user over these relationships. Furthermore, the server 102 is programmed to transmit to the first user device the types of information accessible to the first user device regarding the list of relationships, including the aggregation data.

In some embodiments, the server 102 can be programmed to facilitate pursuit of the list of relationships determined for the first user device or any other relationship identified by the server 102. For example, a graphical user interface can be used to enable preparation and delivery of an introductory digital communication from the first user device to a device corresponding to one of the list of relationships with a few simple user interactions. Furthermore, the server 102 can be configured to analyze the calendar events or other digital communications of the first user or of an individual corresponding to one of the list of relationships and determine schedules, communication habits, or common interests of the first user or the individual. Based on the determination, the server 102 can be configured to send suggestions to the first user device on how to establish contact with the individual, subject to privacy or other constraints specified by the individual. For example, upon determining that the first user and the individual will be attending the same conference, a recommendation to make an in-person introduction before or during this conference can be transmitted to the first user device. For further example, upon determining that the individual composes a large volume of email but schedules relatively few (such as lower than 10%) telephone, video, or in-person conferences, a recommendation to make an email introduction initially can be transmitted to the first user device.

Figure 5:
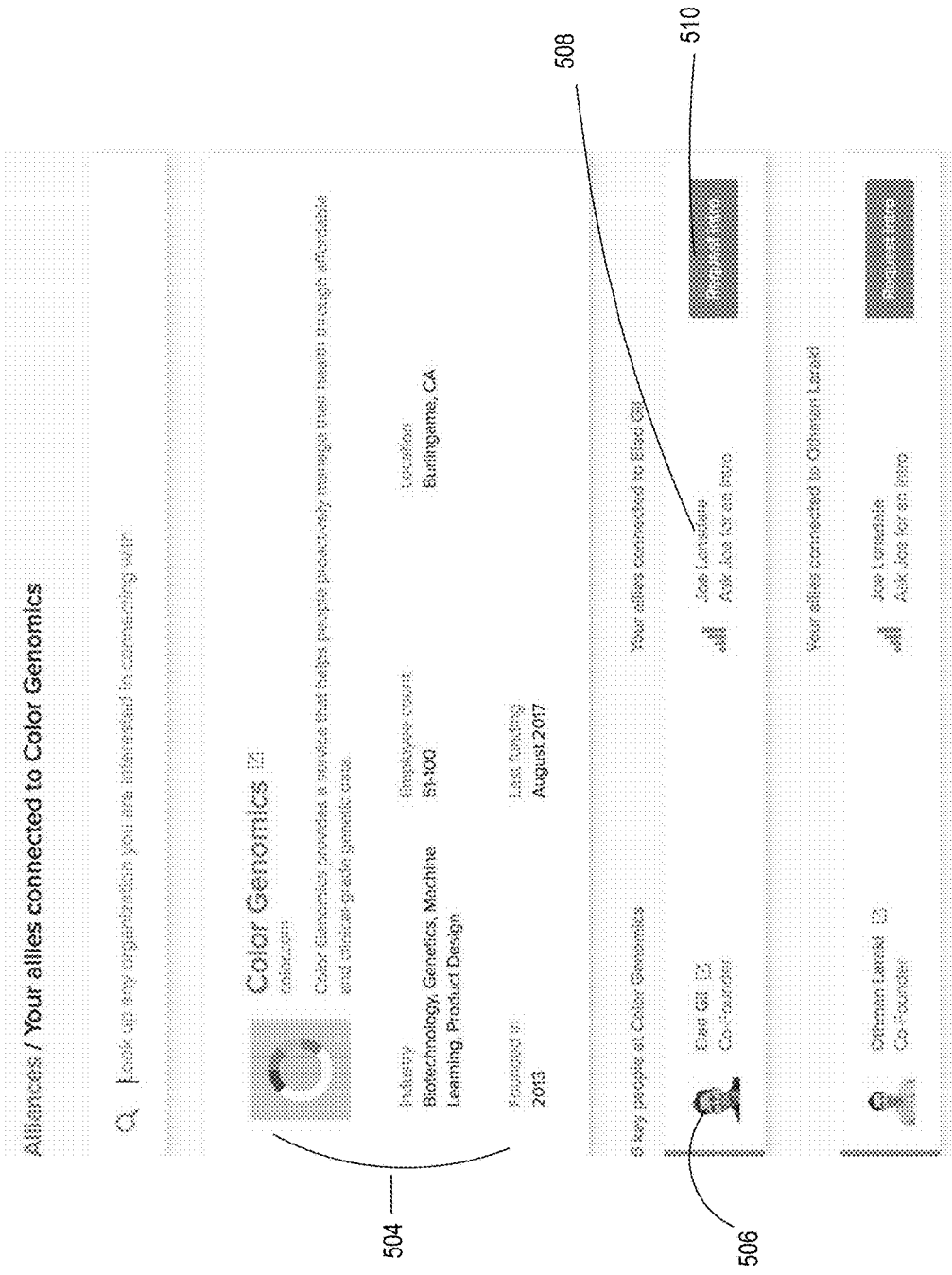
FIG. 5 illustrates an example screen that shows search results in response to a query from a first user device associated with a first user for information regarding relationships associated with an organization.

FIG. 5 illustrates an example screen that shows search results in response to a query from a first user device associated with a first user for information regarding relationships associated with an organization. The screen shows information regarding the queried organization 504, including a name, website, description, industry classification, employee count, location, year of creation, and last time of funding. Additional data regarding the organization stored in the database 220 or less data can be displayed. The screen also shows data regarding a list of relationships involving individuals in the organization who are related to those user accounts who are in the first user's alliances (or alliance network). The screen can also show data regarding one or more allies in the organization. For each of the relationships, the data can include identifying information of the corresponding individual 506, such as a name and an email address, information regarding the relationships that lead to this individual 508, such as names of one or more user accounts who are in the first user's alliance network or communicate with the individual and an indication of an aggregate relationship strength over the one or more user accounts. In addition, the screen can also provide a mechanism 510 that allows the first user to contact the individual through a user in the user's allies (or a chain of people in the user's alliance network). In response to a selection or an activation of this mechanism 510, a default notification can be sent to a device of a corresponding user. Alternatively, another screen corresponding to a new digital communication addressed to that corresponding user can be presented to allow the first user to customize the notification, and the completed digital communication can be delivered to the device of that corresponding user. Alternatively, the screen can show information regarding a communication mechanism to reach the individual directly, as long as such information is visible to the first user to the relevant alliance data.

Figure 6:
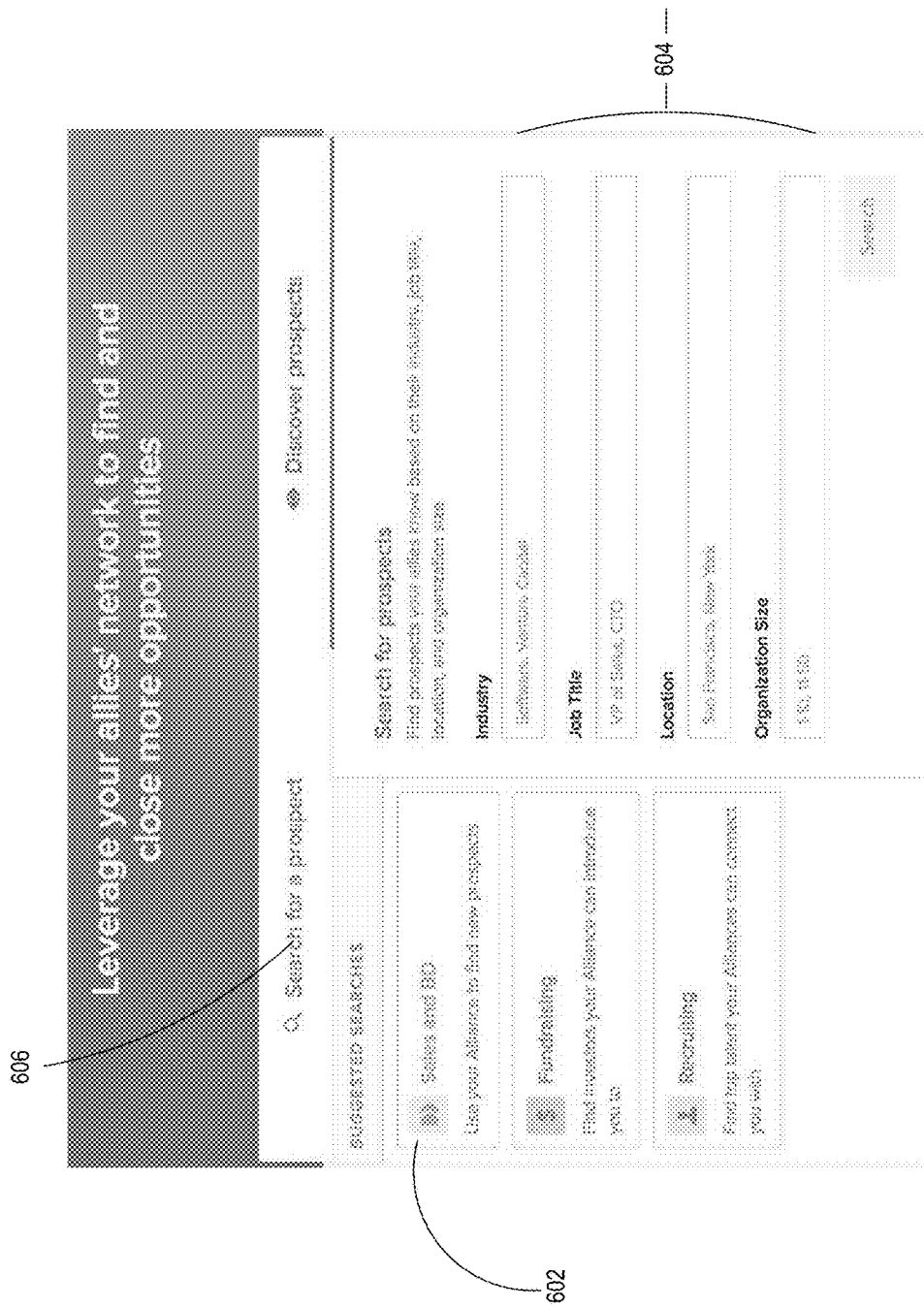
FIG. 6 illustrates an example screen that allows querying for information regarding relationships according to a specific criterion.

In some embodiments, the server 102 is programmed to receive a query for information regarding relationships who satisfy a certain criterion from a first user device. This query is different from a query for information regarding relationships within an organization in that this query is not limited to any organization. Therefore, the relationships found in response to this query can involve individuals who belong to any of multiple organizations or no organization at all. FIG. 6 illustrates an example screen that allows querying for information regarding relationships according to a specific criterion. The screen offers multiple ways to specify the criterion. A user can enter free-form text in the text field 606, such as the title of the position within an organization or the number of years with an organization. The screen also allows the selection of one of the buttons 602 which represent specific industries to which an organization of a prospect may belong, such as fundraising or recruiting, or which represent other specific combinations of attribute values. In addition, the screen allows the input of values into text fields 604 for specific attributes of an organization of a prospect, such as the location or size. The screen may also provide suggestions for these values based on what is already input or data from external sources. For example, in response to an input of "software" as an industry, a suggestion of "hardware" can be presented as a suggestion because these two industries are often searched together. In addition to or instead of the criterion related to an organization of a prospect, a criterion directly related to an individual, such as the age or number of alliances, can also be submitted and processed.

In some embodiments, in response to the query, the server 102 is programmed to determine the queried individuals through their organizations or directly. The query provided by the first user device can be matched to organization data or person data in the database 220 using a pattern matching technique known to someone skilled in the art based on specific rules, similar to the handling of a query for information related to relationships within an organization discussed above. The server 102 is programmed to ultimately identify a list of relationships involving individuals who are related to those user accounts who are in the first user's alliances (or alliance network) and who satisfy the certain criterion, determine the types of information that are accessible to the first user device based on the alliance data for each of the list of individuals, and perform some aggregation on the list of relationships, also similar to the handling of a query for information related to relationships within an organization discussed above.

Figure 7:
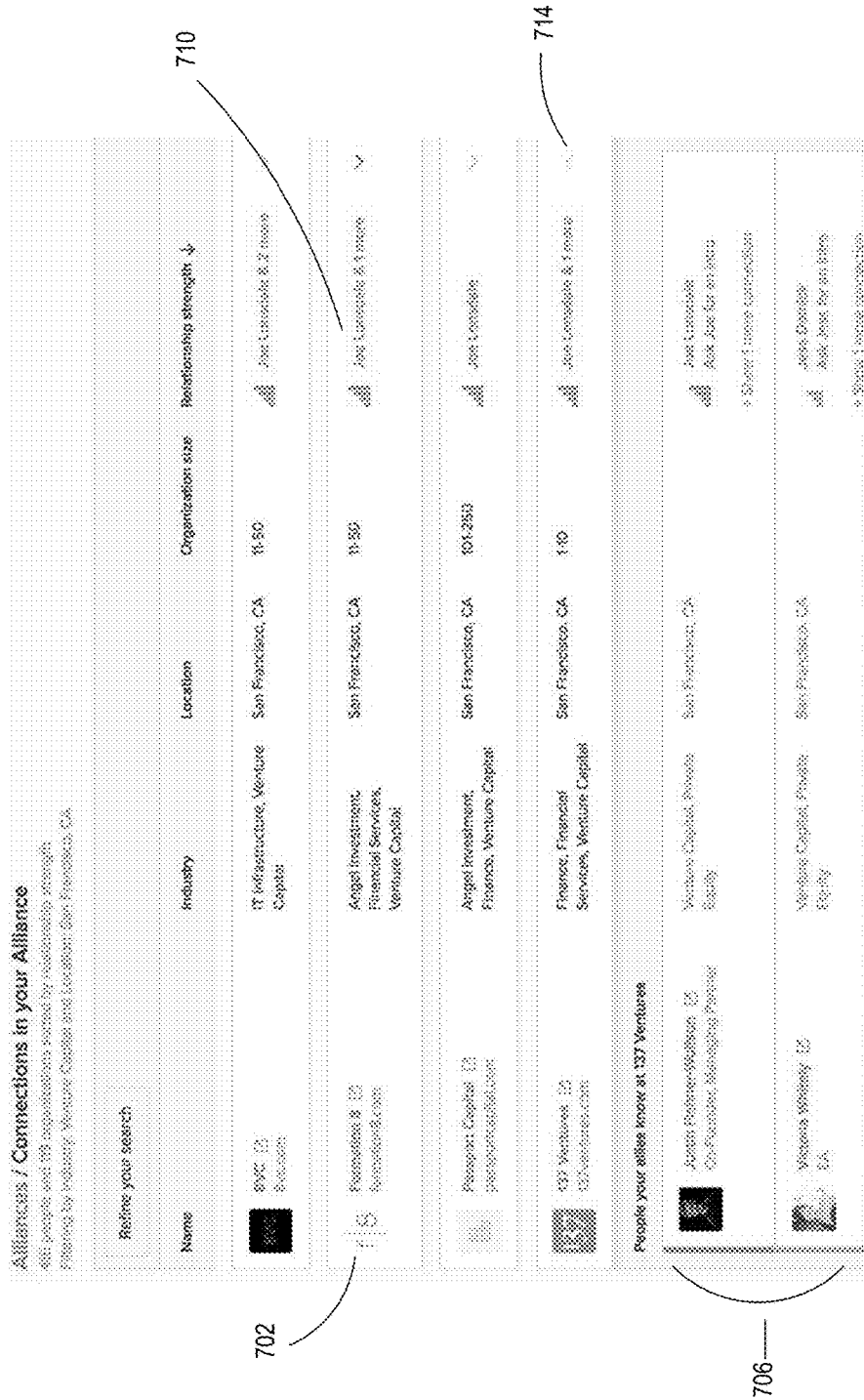
FIG. 7 illustrates an example screen that shows search results in response to a query for information regarding relationships according to a specific criterion.

FIG. 7 illustrates an example screen that shows search results in response to a query for information regarding relationships according to a specific criterion. The screen shows information that is accessible to the first user according to the alliance data regarding each organization that satisfies the query or each organization of an individual that satisfies the query. The information can include identifying information 702, such as the name, a website, or a location, or include values of the attributes that are part of the query. For each of these organizations, the screen also shows aggregate relationship information 710, such as the number of relationships within the organization, the names of one or more user accounts who are in the first user's alliances or alliance network and who communicate with the individuals involved in these relationships, or the average relationship strength over these relationships. For example, for example, for the organization corresponding to the business entity Formation 8, Joe Lonsdale and another user are the first user's allies or are in the first user's alliance network and can be relied on to reach an individual who work for Formation 8. More detailed relationship information can also be shown. In this example, individual-level information 806 is shown as an expansion of the organization-level information, indicating information regarding the list of relationships within the organization. The user can choose to see such expanded information through a toggle 714. The screen can additionally show a list of relationships who do not belong to any organization.

In some embodiments, the server 102 is programmed to identify or suggest prospective allies or prospective contacts for a user or user device. Specifically, the server 102 can be configured to analyze the user's search history, the user's own digital communications including a corresponding communication history, the allies' search histories, or the digital communications of the user's allies that are explorable according to the alliances including a corresponding communication history. Based on the analysis, the server 102 can be configured to then identify individuals who satisfy a certain criterion predetermined by the server 102 or provided by user device. Such criteria might apply to the individual, any organization to which the individual belongs, or the relationship with the user or an ally of the user. For example, one criterion may be a contact who is a manager in a technology company who communicated with the user or an ally within the last six months. Another criterion may be an individual who is at a higher position than an existing contact (with whom the user has communicated) and with whom no other employee of the user's employer has had any digital communication. The server 102 can be programmed to further distinguish between prospective allies and prospective contacts based on specific criteria, such as the strength of the relevant relationship with the prospect, the job title of the prospect, etc. The server 102 can be programmed to determine such prospective allies or contacts according to a specific schedule or upon request by the user device and send appropriate information regarding these prospects to the user device.

In some embodiments, the server 102 is programmed to further estimate the impact of forming an alliance and communicate such estimated impact to a user device to assist the user device in deciding how to form additional alliances. The server 102 can be programmed to estimate the impact for each identified prospective ally or contact, as discussed above, or use the estimated impact to improve the identification of prospective allies or contacts. Subject to privacy or other constraints associated with each user account, the server 102 can be configured to compute certain statistics based on the relationships associated a specific user account. The statistics can be related to the relationships that can be derived from digital communications in one of the communication accounts associated with the specific user account or various attributes of these relationships. For example, the statistics can include a total count of relationships that are new to the user device, an average age of the individuals corresponding to the new relationships, or the number of different employers of those individuals. For further example, the user account might give priority to forming an alliance with the specific user account when the user account is associated with an employer in the food industry and when the statistics show that the new relationships that can be explored as a result of the alliance are associated with many employers in the food industry.

5. Example Processes

Figure 8:
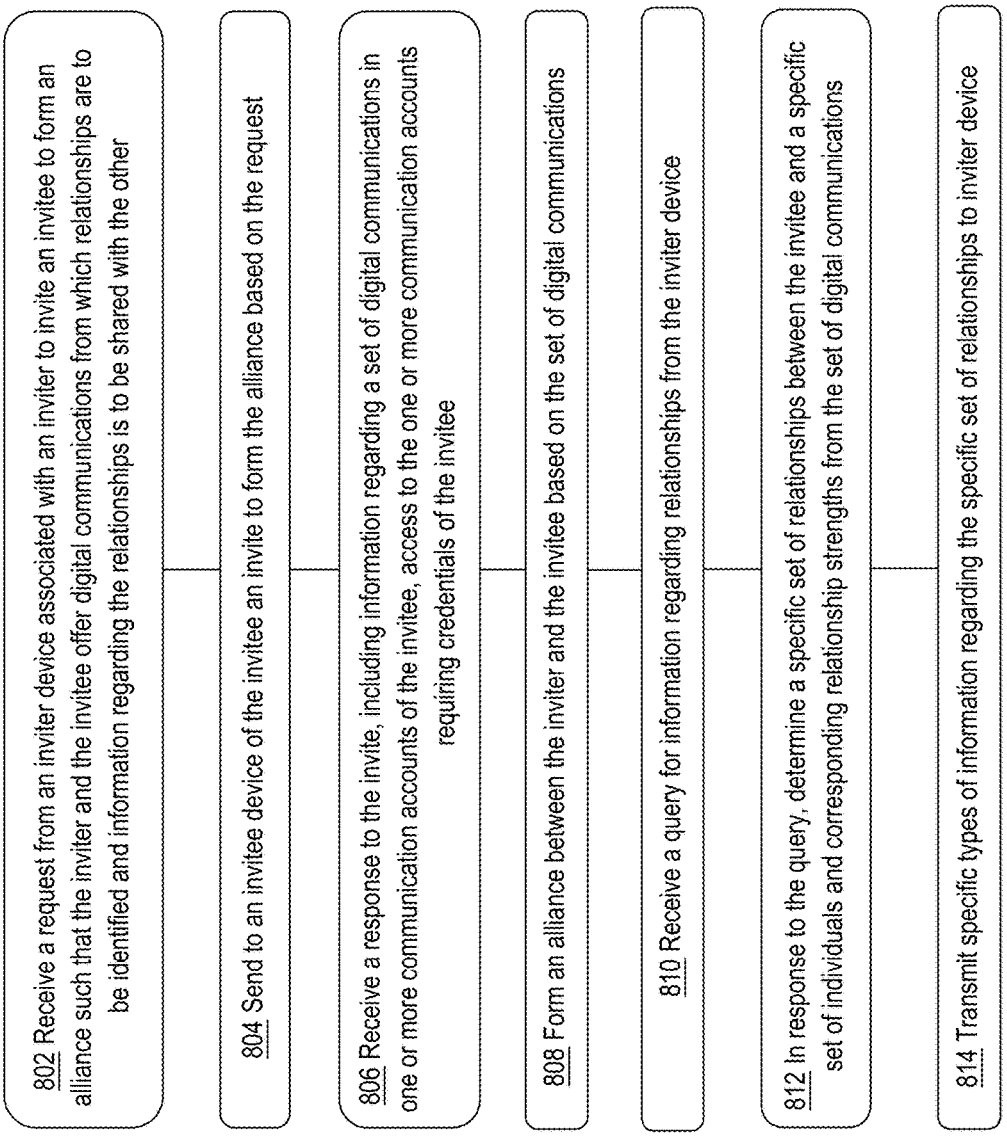
FIG. 8 illustrates an example process performed by the communication management server computer of managing alliances and associated relationship data.

FIG. 8 illustrates an example process performed by the server of managing alliances and associated relationship data alliances. FIG. 8 is shown in simplified, schematic format for purposes of illustrating a clear example and other embodiments may include more, fewer, or different elements connected in various manners. FIG. 8 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, in step 802, the server 102 is programmed or configured to receive a request from an inviter device associated with an inviter to invite an invitee to form an alliance such that the inviter and the invitee offer digital communications from which relationships are to be identified and information regarding the relationships is to be shared with the other. To form an alliance, the initial request or subsequent communications with the server 102 would include credentials for one or more communication accounts of the inviter. The initial request or subsequent communications would also include a selection criterion to be applied to the digital communications in the one or more communication accounts to form a set of digital communications unless all the digital communications in the one or more communication accounts are to be associated with the alliance by default. Furthermore, the initial request or subsequent communications would include a specification of types of information regarding relationships identified from the inviter's set of digital communications unless the name of each contact and a corresponding relationship strength are to be used by default.

In step 804, the server 102 is programmed or configured to send to an invitee device of the invitee an invitation to form the alliance based on the request. Information as to how to reach the invitee device would be included in the request unless the invitee device is already in communication with the server 102. The invitation would include at least a portion of the data in the request, and more data can be sent to the invitee device upon request. The invitation can be sent directly to the invitee device or through a communication account of the invitee.

In step 806, the server 102 is programmed or configured to receive a response to the invite. A response accepting the invitation would typically include information regarding a set of digital communications in one or more communication accounts of the invitee, access to the one or more communication accounts requiring credentials of the invitee. The response or subsequent communications with the server 102 can include the other data required for forming the alliance, similar to those sent to the server 102 by the inviter device.

In step 808, the server 102 is programmed or configured to form an alliance between the inviter and the invitee based on the set of digital communications of the inviter and the invitee. The data required for forming the alliance can be saved in a database. The set of digital communications of the inviter and the invitee can be retrieved, filtered, or mined as soon as the credentials for accessing the communication accounts of the inviter or the invitee are received, according to a specific schedule, or in response to relevant queries. In addition, the server 102 can be configured to ultimately form separate alliances between the inviter device and other devices, and similarly between the invitee device and additional devices.

In step 810, the server 102 is programmed or configured to receive a query for information regarding relationships from the inviter device. The query could also come from the invitee device, and the query processing would be the same except that the roles of the inviter and the invitee are switched. The query could be limited to relationships within certain organizations, which may correspond to prospective customers or employers of the inviter, for example.

In step 812, in response to the query, the server 102 is programmed or configured to determine a specific set of relationships between the invitee and a specific set of individuals (contacts) and corresponding relationship strengths from the set of digital communications of the invitee associated with the alliance. For example, when the invitee chats on a daily basis with a certain individual based on the set of digital communications of the invitee, the corresponding relationship strength might be relatively high. The server 102 can also be configured to determine values of various attributes of each of the specific set of contacts, such as gender, employer, title, location, organization, etc. from the digital communications with the contact, the local database, or external data sources. For example, the title of the contact might be extracted from the signature block of a digital communication of the contact. When the inviter device has formed separate alliances with other devices, the server is configured to also repeat the process with the sets of digital communications of the user accounts associated with those separate alliances. The server 102 can be programmed to further aggregate data regarding the specific set of relationships by industry, organization, or distinct individual.

In step 814, the server 102 is programmed or configured to transmit specific types of information regarding the specific set of relationships to inviter device. The specific types of information by default could be the name of a contact in the relationship and the corresponding relationship, or include additional data, such as headers or summaries of the digital communications, according to the invitee's specification.

6. Hardware Implementation

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
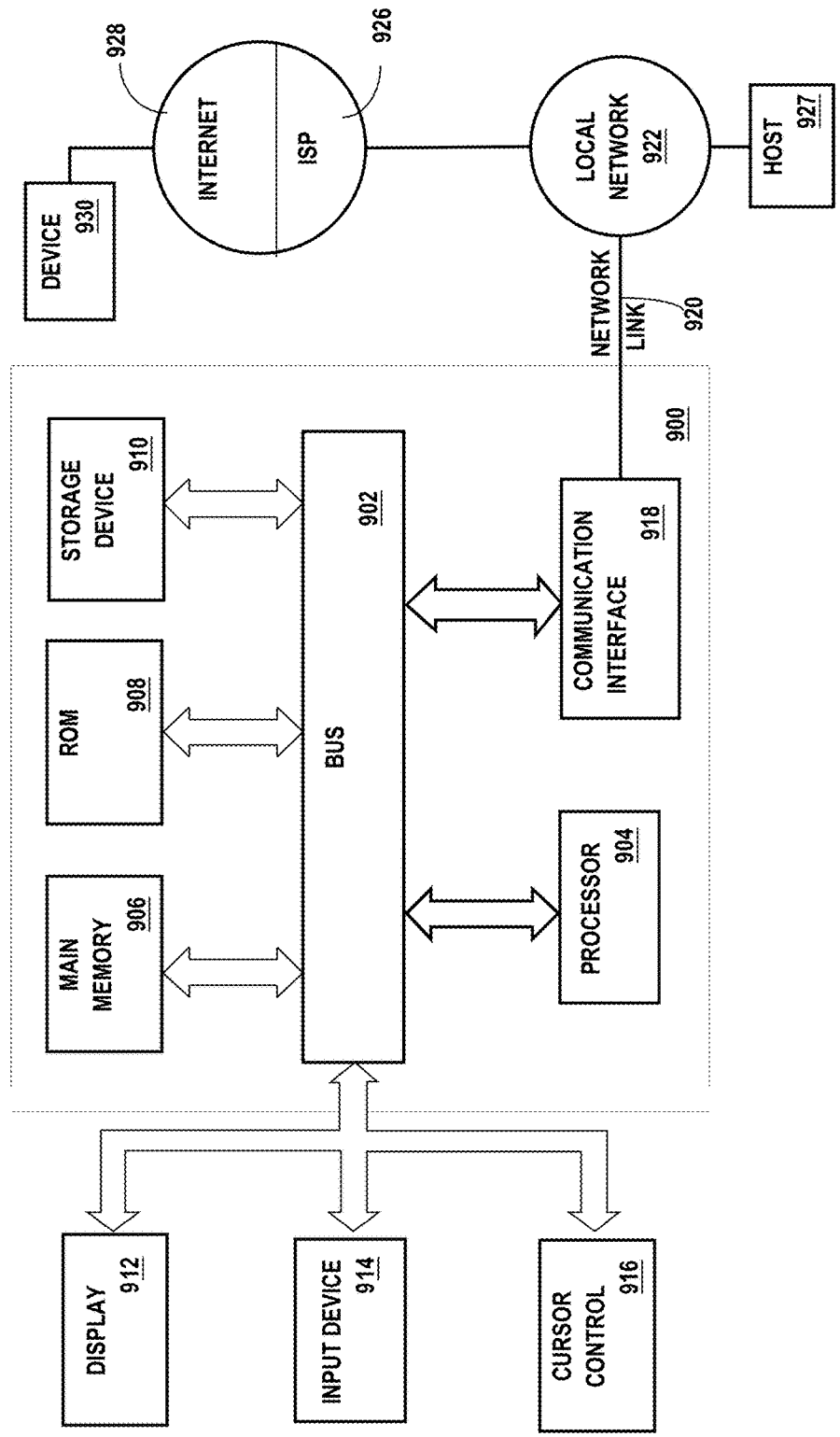
FIG. 9 is a block diagram that illustrates a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system ~00 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of communicating digital data among user accounts based upon constraints and digital data representing an alliance, comprising:
   receiving, by a processor, a request from an inviter device associated with an inviter to invite an invitee to form an alliance such that the inviter and the invitee offer digital communications from which relationships are to be identified, information regarding the relationships of the inviter is to be shared with the invitee, and information regarding the relationships of the invitee is to be shared with the inviter,
   the request including information regarding a first set of digital communications in one or more communication accounts of the inviter, access to the one or more communication accounts of the inviter requiring credentials of the inviter;
   sending, by the processor, to an invitee device of the invitee an invitation to form the alliance based on the request;
   receiving a response to the invitation, including information regarding a second set of digital communications in one or more communication accounts of the invitee, access to the one or more communication accounts of the invitee requiring credentials of the invitee;
   creating and storing digital alliance data representing an alliance between the inviter and the invitee based on the first set of digital communications and the second set of digital communications;
   receiving a query for information regarding relationships from the inviter device;
   in response to the query, determining a specific set of relationships between the invitee and a specific set of individuals and corresponding relationship strengths from the second set of digital communications;
   transmitting specific types of information regarding the specific set of relationships to the inviter device according to privacy constraints in the digital alliance data.

2. The computer-implemented method of claim 1, the invitation including the information regarding the first set of digital communications.

3. The computer-implemented method of claim 1, further comprising:
   receiving a second query for information regarding relationships from the invitee device;
   in response to the second query, determining a certain set of relationships between the inviter and a certain set of individuals and corresponding relationship strengths from the first set of digital communications;
   transmitting certain types of information regarding the certain set of relationships to invitee device.

4. The computer-implemented method of claim 1, the invitation including a request for information regarding access to at least one communication accounts of the invitee.

5. The computer-implemented method of claim 1, the set of digital communications including one or more of email messages, calendar entries, phone call histories, or chat messages.

6. The computer-implemented method of claim 1, the response specifying the set of digital communications by including a selection criterion to be applied to the digital communications in the one or more communication accounts by type, party, communication domain, location, delivery date, or receipt date of a digital communication.

7. The computer-related method of claim 1, the specific types of information regarding the specific set of relationships including, for one of the specific set of individuals, a name of the individual, the corresponding relationship strength, a name of an organization to which the individual belongs, a size of the set of digital communications with the individual, a header of each of the set of digital communications with the individual, or a summary of the set of digital communications with the individual.

8. The computer-implemented method of claim 1, the specific types of information regarding the specific set of relationships being based on a specification in the response.

9. The computer-implemented method of claim 1,
   the query specifying one or more attributes of an organization,
   the specific set of relationships being further between the invitee and a specific set of individuals each of whom belongs to an organization having the one or more specified attributes.

10. The computer-implemented method of claim 1, further comprising:
    receiving a request from the inviter device to request the invitee to make an introduction to one of the specific set of individuals;
    sending the request to the invitee device.

11. The computer-implemented method of claim 1, further comprising:

receiving a request for information regarding relationships of the invitee from the inviter device;

transmitting data regarding the specific set of relationships, including identities of the specific set of individuals and the corresponding set of relationship strengths to the inviter device.

12. The computer-implemented method of claim 1, further comprising:

determining one of the specific set of individuals as a prospective ally or contact for the inviter based on a search history or a communication history of the inviter device;

transmitting a suggestion of the prospective ally or contact to the inviter device.

13. The computer-implemented method of claim 1, further comprising:

receiving a certain query for information regarding relationships from a certain device associated with a certain individual who is in a certain alliance with the inviter;

in response to the certain query, determining a certain set of relationships between the invitee and a certain set of individuals and corresponding relationship strengths from the set of digital communications according to certain privacy constraints in the digital alliance data;

transmitting certain types of information regarding the certain set of relationships to the certain device according to the certain privacy constraints in the digital alliance data.

14. One or more non-transitory storage media storing instructions which, when executed by one or more computing devices, cause performance of a method of communicating digital data among user accounts based upon constraints and digital data representing an alliance, the method comprising:

receiving a request from an inviter device associated with an inviter to invite an invitee to form an alliance such that the inviter and the invitee offer digital communications from which relationships are to be identified, information regarding the relationships of the inviter is to be shared with the invitee, and information regarding the relationships of the invitee is to be shared with the inviter, the request including information regarding a first set of digital communications in one or more communication accounts of the inviter, access to the one or more communication accounts of the inviter requiring credentials of the inviter;

sending to an invitee device of the invitee an invitation to form the alliance based on the request;

receiving a response to the invitation, including information regarding a second set of digital communications in one or more communication accounts of the invitee, access to the one or more communication accounts of the invitee requiring credentials of the invitee;

creating and storing digital alliance data representing an alliance between the inviter and the invitee based on the first set of digital communications and the second set of digital communications;

receiving a query for information regarding relationships from the inviter device;

in response to the query, determining a specific set of relationships between the invitee and a specific set of individuals and corresponding relationship strengths from the second set of digital communications;

transmitting specific types of information regarding the specific set of relationships to the inviter device according to privacy constraints in the digital alliance data.

15. The one or more non-transitory storage media of claim 14, the method further comprising:

receiving a second query for information regarding relationships from the invitee device;

in response to the second query, determining a certain set of relationships between the inviter and a certain set of individuals and corresponding relationship strengths from the first set of digital communications;

transmitting certain types of information regarding the certain set of relationships to invitee device.

16. The one or more non-transitory storage media of claim 14, the query specifying one or more attributes of an organization, the specific set of relationships being further between the invitee and a specific set of individuals each of whom belongs to an organization having the one or more specified attributes.

17. The one or more non-transitory storage media of claim 14, the method further comprising:

receiving a request from the inviter device to request the invitee to make an introduction to one of the specific set of individuals;

sending the request to the invitee device.

18. The one or more non-transitory storage media of claim 14, the method further comprising:

receiving a request for information regarding relationships of the invitee from the inviter device;

transmitting data regarding the specific set of relationships, including identities of the specific set of individuals and the corresponding set of relationship strengths to the inviter device.

19. The one or more non-transitory storage media of claim 14, the method further comprising:

determining one of the specific set of individuals as a prospective ally or contact for the inviter based on a search history or a communication history of the inviter device;

transmitting a suggestion of the prospective ally or contact to the inviter device.

20. The one or more non-transitory storage media of claim 14, the method further comprising:

receiving a certain query for information regarding relationships from a certain device associated with a certain individual who is in a certain alliance with the inviter;

in response to the certain query, determining a certain set of relationships between the invitee and a certain set of individuals and corresponding relationship strengths from the set of digital communications according to certain privacy constraints in the digital alliance data;

transmitting certain types of information regarding the certain set of relationships to the certain device according to the certain privacy constraints in the digital alliance data.

* * * * *